Jan. 9, 1951     E. J. BLOOMER     2,537,183
COUPLING CONNECTION
Filed March 14, 1949
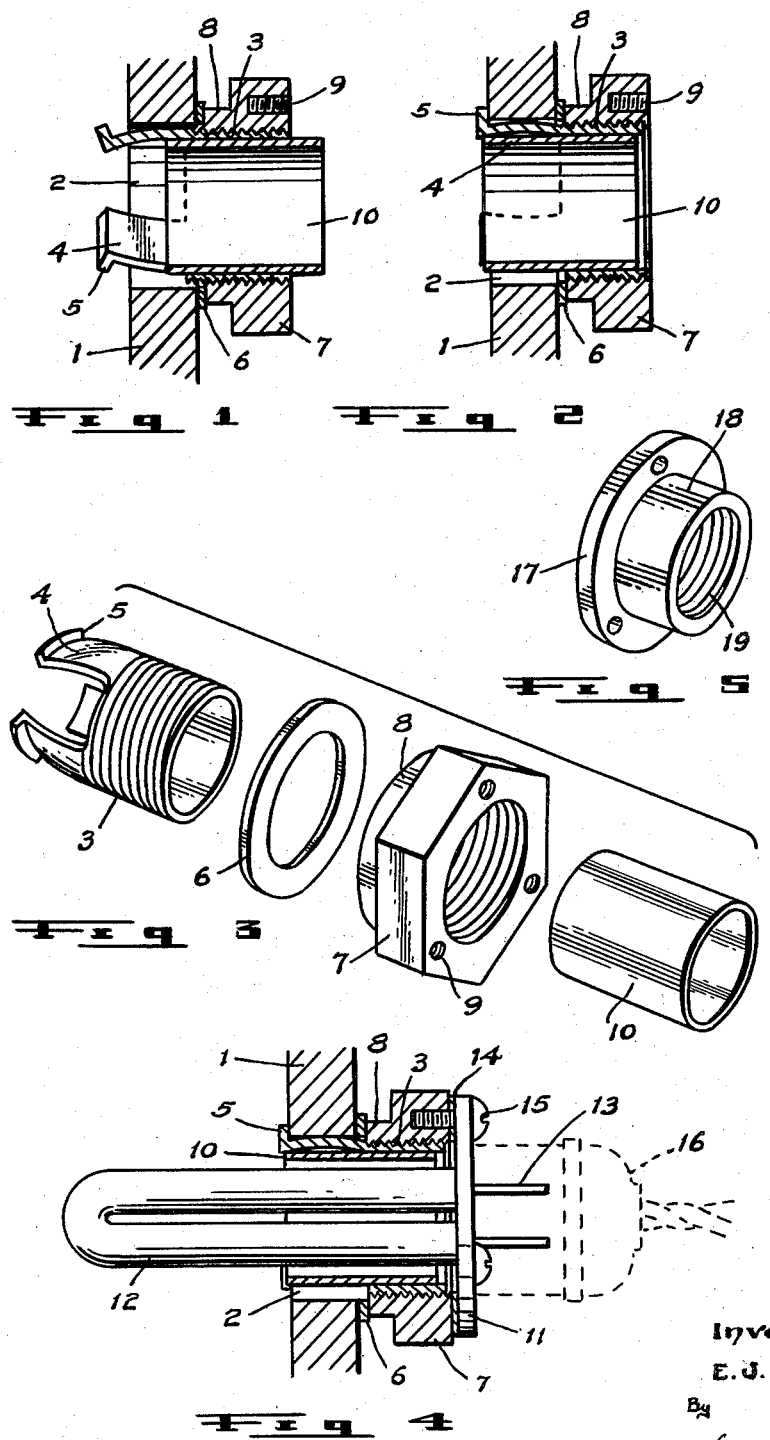
Inventor
E. J. Bloomer
By
Walter C. Baggis
AGENT Patented Jan. 9, 1951

2,537,183

UNITED STATES PATENT OFFICE 2,537,183

COUPLING CONNECTION

Edward James Bloomer, Norwood, Manitoba, Canada

Application March 14, 1949, Serial No. 81,388

5 Claims. (Cl. 285—47.1)

The invention relates to a coupling connection and particularly for connections to blind holes, such as are often found in various kinds of containers and castings. In making such connections it is not always possible or desirable to drill and thread holes for securing the connection, and even if such can be done, the resulting connection is not always strong, fluidtight or spacious enough for the purpose.

The object of the present invention is to provide a strong construction which can be secured to an opening or blind hole in a container or casting, which will not come apart, will make a fluidtight joint, and can be used for fluid passage to or from the container or for the securing of various devices or attachments thereon or therein.

A further object of the invention is to provide means for forcibly expanding said connection to lock behind said blind hole and retain said connection in said expanded position.

A still further object of the invention is to construct said connection in a simple, cheap and durable manner and such that ample central space is provided for fluid or material passage therethrough.

With the above important objects in view which will become more apparent as the description proceeds the invention consists essentially in the design and construction of the parts hereinafter more particularly described, reference being had to the accompanying drawings in which:

Figure 1 is a vertical section through a blind hole and showing the coupling connection in position ready for fastening.

Figure 2 is a vertical section, the same as Figure 1, with the coupling connection clamped in position.

Figure 3 is an exploded perspective view showing the various parts comprising the coupling connection in position ready for assembly.

Figure 4 is a vertical section, the same as Figure 2, showing the coupling connection used in conjunction with an engine block heater.

Figure 5 is a perspective view showing a pipe connection fitting adaptable for use with the coupling connection.

In the drawings like characters of reference indicate corresponding parts in the several figures.

A wall is shown in Figures 1, 2 and 4 and is generally indicated by the numeral 1. This wall has an unthreaded hole 2 which could be termed a "blind hole." The coupling connection comprising this invention is an assembly of parts which is shown in relation to this blind hole in the figures mentioned and will now be explained.

Referring to Figure 3; a hooking member 3 forms one unit of the assembly and consists of an exteriorly threaded tubing having three equi-spaced tongues 4 extending rearwardly therefrom. Each of these tongues curve inwardly as they extend back and their extreme ends are provided with outwardly projecting lips 5 which are confined within the diameter of the threads of said tubing.

An annular gasket 6 is the second unit of the assembly and is formed in the well known manner from suitable gasket material.

A clamping nut 7 forms the third unit of the assembly and comprises, in the present instance, an interiorly threaded hexagon nut which is adapted to receive and thread onto the threaded portion of the hooking member 3. This nut has a circular flange 8 at the rear while the front face is provided with three equi-spaced tapped holes 9 therearound.

The fourth unit comprises a relatively thin walled tubing 10 of an outer diameter such that it will freely slide into the tubing of the hooking member 3.

The four units are assembled as follows. The gasket 6 is slipped over the hooking member 3, the clamping nut 7 is screwed onto the threads of the hooking member and the tubing 10 is telescoped inside the hooking member with a slight portion extending therefrom, as shown in Figure 1. The assembly is then ready for reception in a blind hole, as shown in Figure 1, the tongues 4 passing through the hole and the gasket 6 contacting the surrounding wall.

To secure the connection to the blind hole, the extending end of the tubing 10 is struck a series of blows with a hammer, preferably through the use of a suitable punch. The force of the blows causes the tubing to move back against the interior walls of the tongues 4 which bend outwardly until the tubing passes completely thereunder. By observing Figure 2 it will be seen that the tubing has forced the lips 5 behind the rear edge of the blind hole so that the hooking member cannot be withdrawn while the tubing 10 prevents the tongues from returning to their original position. The tubing is left in this position. The clamping nut 7 is then tightened to press the flange 8 against the gasket and as the three tongues 4 are equi-spaced they hold the hooking member firmly. Accordingly, a fluid tight connection results at the gasket and various attachments can be secured to the clamping nut.

The view at Figure 4 shows the coupling connection used for the installation of an electric heater to an engine block. In this arrangement a disc 11 has a hairpin shaped element 12 secured to one side and connector prongs 13 to the other side. The element is passed through the centre of the tubing 10, an annular gasket 14 is placed between the disc and the clamping nut 7, and screws 15 tighten the disc thereagainst in a liquid-tight joint. The prongs 13 can be connected to electric power as shown by the dotted lines 16 and the installation is complete.

It might be mentioned at this time that sometimes the element 12 is provided with a side bend to avoid striking the cylinder walls. The large central opening in the coupling connection is usually sufficient to permit the insertion of this type of element. However, if the clearance within the block is not sufficient the clamping nut 7 can be loosened which will permit bodily movement of the assembly and so allow greater freedom for a proper installation.

The view shown in Figure 5 is a modified form of the disc 11 for use when a pipe is to be attached to the assembly. In this arrangement a disc 17 is provided with a flange 18 and interiorly threaded as at 19. The disc is attached to the clamping nut by the screws 15 in the same manner as the disc 11 while a pipe (not shown) is screwed into the threads 19.

By observing the arrangements shown in Figures 4 and 5 it will be readily seen that many different variations of installations can be used with this type of coupling connection. The connection is always fluidtight, it is held firmly to the wall and cannot come loose while the inner tubing, not only holds the tongues in place, but offers a smooth roomy central passageway for inserts.

What I claim as my invention is:

1. A coupling connection, comprising: a threaded tubing having one end formed with an inwardly curving reduced internal diameter; an outwardly projecting flange on said reduced end with the periphery thereof of less diameter than the outside diameter of said tubing; a nut receivable on the threads of said tubing; and a secondary tubing slidably telescoped within said first mentioned tubing and contactable against the walls of said first mentioned tubing at said reduced diameter.

2. A coupling connection, comprising: a threaded tubing having a plurality of bent prongs extending therefrom in a direction such that they cut into the plane of the hollow centre of said tubing; outwardly projecting lips on the ends of said prongs; a nut threadable on said tubing; and a secondary tubing slidably telescoped within said first mentioned tubing and contactable against the inturned faces of said tongues.

3. A coupling connection, comprising: an externally threaded tubing having a plurality of inwardly curved prongs extending therefrom and such that the ends thereof cut into the plane of the hollow centre of said tubing; the ends of said prongs outwardly turned to form lips, the outside diameter of said lips being confined within the outside diameter of said tubing; a nut threadable on said tubing; and a secondary tubing slidably telescoped within said first mentioned tubing and contactable with the inside faces of said prongs; and means on said coupling connection for securing attachments thereto.

4. A coupling connection, comprising: an externally threaded tubing having a plurality of inwardly curved prongs extending therefrom and such that the ends thereof cut into the plane of the hollow centre of said tubing; the ends of said prongs outwardly turned to form lips, the outside diameter of said lips being confined within the outside diameter of said tubing; a nut threadable on said tubing; and a secondary tubing telescoped within said first mentioned tubing, and said secondary tubing mounted therein for movement through said first mentioned tubing by exterior force to press said prongs outwardly and extend said lips into a larger diameter; and means on said nut for securing attachments to said coupling connection.

5. A coupling connection comprising externally threaded tubing having a plurality of inwardly curved prongs extending therefrom and such that the ends thereof cut into the plane of the hollow centre of said tubing, the ends of said prongs outwardly turned to form lips, the outside diameter of said lips being confined within the outside diameter of said tubing; a nut threadable on said tubing; and a secondary tubing telescoped within said first mentioned tubing, the said secondary tubing being mounted therein for movement through said first mentioned tubing by exterior force to press the said prongs outwardly and extend said lips into a larger diameter and being of a length not greater than the length of the said externally threaded tubing, and means on the said nut for securing attachments to the said coupling connection.

EDWARD JAMES BLOOMER.

REFERENCES CITED

The following references are of record in the file of this patent:

UNITED STATES PATENTS

| Number | Name | Date |
|---|---|---|
| 1,745,941 | Metcalf | Feb. 4, 1930 |
| 1,879,920 | Church | Sept. 27, 1932 |